United States Patent
Motz et al.

(10) Patent No.: US 8,974,311 B2
(45) Date of Patent: Mar. 10, 2015

(54) METHOD AND DEVICE FOR INSTALLING SYNTHETIC TURF

(75) Inventors: Joseph E. Motz, Cincinnati, OH (US); David P. Motz, Cincinnati, OH (US)

(73) Assignee: Technology Licensing Corp., Newtown, OH (US)

( * ) Notice: Subject to any disclaimer, the term of this patent is extended or adjusted under 35 U.S.C. 154(b) by 843 days.

(21) Appl. No.: 13/206,723

(22) Filed: Aug. 10, 2011

(65) Prior Publication Data

US 2012/0067996 A1     Mar. 22, 2012

Related U.S. Application Data

(60) Provisional application No. 61/372,319, filed on Aug. 10, 2010.

(51) Int. Cl.

| | |
|---|---|
| *E01C 23/00* | (2006.01) |
| *B65H 18/10* | (2006.01) |
| *A01G 1/00* | (2006.01) |
| *E01C 13/08* | (2006.01) |
| *B60P 1/00* | (2006.01) |

(Continued)

(52) U.S. Cl.
CPC ............. *B65H 18/10* (2013.01); *A01G 1/004* (2013.01); *E01C 13/08* (2013.01); *B60P 1/00* (2013.01); *E01C 19/522* (2013.01); *E01C 23/00* (2013.01)
USPC ............................................ 472/92; 242/393

(58) Field of Classification Search
CPC ....... E01C 13/00; E01C 13/08; E01C 13/045; B65H 54/00; B65H 54/42
USPC ............. 472/88, 89, 90, 92, 94, 136; 242/393
See application file for complete search history.

(56) References Cited

U.S. PATENT DOCUMENTS

| | | | |
|---|---|---|---|
| 3,257,785 A | | 6/1966 | Rimes |
| 4,084,763 A | * | 4/1978 | Zamboni ...................... 242/393 |
| 4,878,542 A | * | 11/1989 | Brouwer et al. ................. 172/1 |

(Continued)

FOREIGN PATENT DOCUMENTS

| | | |
|---|---|---|
| JP | 3266913 | 11/1991 |
| WO | 2010094576 | 8/2010 |

OTHER PUBLICATIONS

International Search Report and Written Opinion for PCT/US2012/33829, US Patent and Trademark Office, Sep. 21, 2012.

*Primary Examiner* — Kien Nguyen
(74) *Attorney, Agent, or Firm* — Wood, Herron & Evans, LLP (57) ABSTRACT

A method and device for installing synthetic turf uses a motorized turf rollout vehicle and a frame removably carried by the vehicle, the frame holding a roll of synthetic turf on a spindle at a first, forward end thereof. The roll and spindle are held in an orientation that is transverse to the first forward direction, and have a transverse dimension that extends beyond that of the vehicle. As the vehicle moves forward in the first direction, the vehicle engages and pulls the roll of turf, and the vehicle also moves on top of the just-unrolled portion of the turf. This accurately and efficiently places the turf on and over the base, in a desired position. Because the vehicle moves on top of the just unrolled section of turf, the present invention eliminates direct contact with, and disruption to, the underlying prepared base. This method and device reduces the time and cost associated with locating a roll of synthetic turf over a base during the installation of an athletic field, compared to prior installation methods.

18 Claims, 7 Drawing Sheets

(51) Int. Cl.
*E01C 19/52* (2006.01)
*B65H 54/00* (2006.01)

(56) References Cited

U.S. PATENT DOCUMENTS

| | | |
|---|---|---|
| 5,307,880 A | 5/1994 | Woerner |
| 5,902,414 A | 5/1999 | Keal et al. |
| 6,655,469 B1 | 12/2003 | Davis |
| 2003/0037388 A1 | 2/2003 | Feyma et al. |
| 2010/0001115 A1 | 1/2010 | Jonsson |
| 2010/0319510 A1 | 12/2010 | Bearden |
| 2012/0017939 A1 | 1/2012 | Davis et al. |
| 2012/0096661 A1 | 4/2012 | Pizano et al. |

* cited by examiner

FIG. 6

METHOD AND DEVICE FOR INSTALLING SYNTHETIC TURF

CROSS-REFERENCE TO RELATED APPLICATIONS

This application claims priority to U.S. Provisional Patent Application No. 61/372,319, filed Aug. 10, 2010, entitled "Device and Method for Installing Synthetic Turf," which is hereby incorporated by reference herein, in its entirety.

FIELD OF THE INVENTION

The present invention relates to synthetic turf, and more particularly, to a method and device that reduce the time and costs associated with installing synthetic turf.

BACKGROUND OF THE INVENTION

Synthetic turf continues to gain popularity as an athletic field surface for professional teams, college teams, high school teams, and even public parks. Current types of athletic turf simulate natural grass very well, while eliminating costs related to maintenance, such as watering, mowing, fertilizing, and even replacing, when bare spots occur.

As a result of this ever increasing popularity, there is an ongoing need for more efficient and consistent methods for installing synthetic turf. Typically, the rolls of synthetic turf are unrolled to place them in the desired position. If an underlying pad is used, it is also typically unrolled into position, prior to placement of the turf. This unrolling procedure is done manually, with the roll of turf mounted on a spindle that is held by a wheeled cart, so that the spindle is rotatable. The work crew pulls (and/or pushes) the cart along the desired path, at both ends of the cart, while also pulling the turf into the desired position.

As the cart is moving, the crew must continue to make sure that the roll of turf is unrolling properly, in alignment with the adjacently located roll of turf. Also, at least one or even two members of the crew walk on the unrolled turf, behind the cart, to hold down the unrolled turf and prevent it from being dragged along the surface as the cart advances. Sometimes this can cause unevenness or "waves" in the unrolled turf. If such waves or wrinkles occur, the crew must manually move the turf to remove them.

This method of installation is labor intensive, due to the needs to move and guide the cart while unrolling the turf, and the need to use manual labor to walk on the unrolled turf to hold it in place. Also, because the cart is typically pushed and directed at its opposite ends by the installing crew, on at least one side of the cart someone on the crew will be walking on the prepared base surface, onto which the turf is being installed. It is important that this prepared base surface remain level. But if a crew member walks on that prepared surface, and makes tracks in that surface, there may be a need to thereafter rake out those tracks, prior to placement of the next roll. Also, sometimes the wheels of these carts can cause damage to an adjacently located surface, such as a nearby athletic track which surrounds the athletic field.

It is an object of the present invention to reduce the time and cost associated with installing a synthetic turf.

It is another object of the present invention to remedy the disruption of the prepared base that sometimes occurs during installation of the synthetic turf, so as to reduce the need to rework the prepared base.

It is still another object of the present invention to eliminate, or at least minimize, any waves or wrinkles that could occur in just-unrolled sections of synthetic turf.

It is still another object of the present invention to eliminate the potential for damaging an adjacently located surface, such as a track, when installing a synthetic turf.

SUMMARY OF THE INVENTION

The present invention achieves the above-stated objects by installing a synthetic turf with a motorized turf rollout vehicle, and a frame removably secured to the vehicle, the frame holding a roll of synthetic turf on a spindle at a first, forward end thereof. Preferably, the vehicle has a pair of spaced endless loop treads and a pair of spaced arms located within the treads at the first forward end of the vehicle. The frame removably connects to the arms, and the frame, the roll, and the spindle have a transverse dimension that extends laterally beyond the transverse dimension of the vehicle.

As the vehicle travels in the first, forward direction, the vehicle holds the roll of turf out in front of the operator, and the vehicle rolls on top of the just unrolled section of turf. This allows the operator to see the edge of the synthetic turf as it unrolls, during installation, and to unroll it in the correct location. This precision eliminates the need to manually tug and pull the turf in order to get it into position for connecting to an adjacently located section of turf. Thus, the present invention improves efficiency in accurately installing rolls of synthetic turf on an athletic field.

Because the vehicle runs on top of the just-unrolled section of synthetic turf, this keeps the unrolled sections from being pulled along as it is laid out. This arrangement puts tension on the roll of synthetic turf held by the spindle, as the unrolling occurs, and also helps to eliminate the waves or wrinkles that could otherwise occur in the already unrolled sections.

Because the vehicle moves on an already unrolled section of synthetic turf and not on the prepared base surface, the present invention protects the prepared surface from rutting/displacement. Also, the treads of the vehicle help to displace the weight of the vehicle and the roll of turf as it moves across an adjacently located surface, such as a track. This reduces the occurrence of damage to the adjacently located surface.

According to one aspect of the invention, the frame can be disassembled into components that fit into the back of a pickup truck, or onto a small towable trailer. This enables relatively easy transport to the site of the field installation.

Those skilled in the art will more readily understand the disclosure in the context of the drawings, which are described below.

DETAILED DESCRIPTION OF THE DRAWINGS

Figure 1:
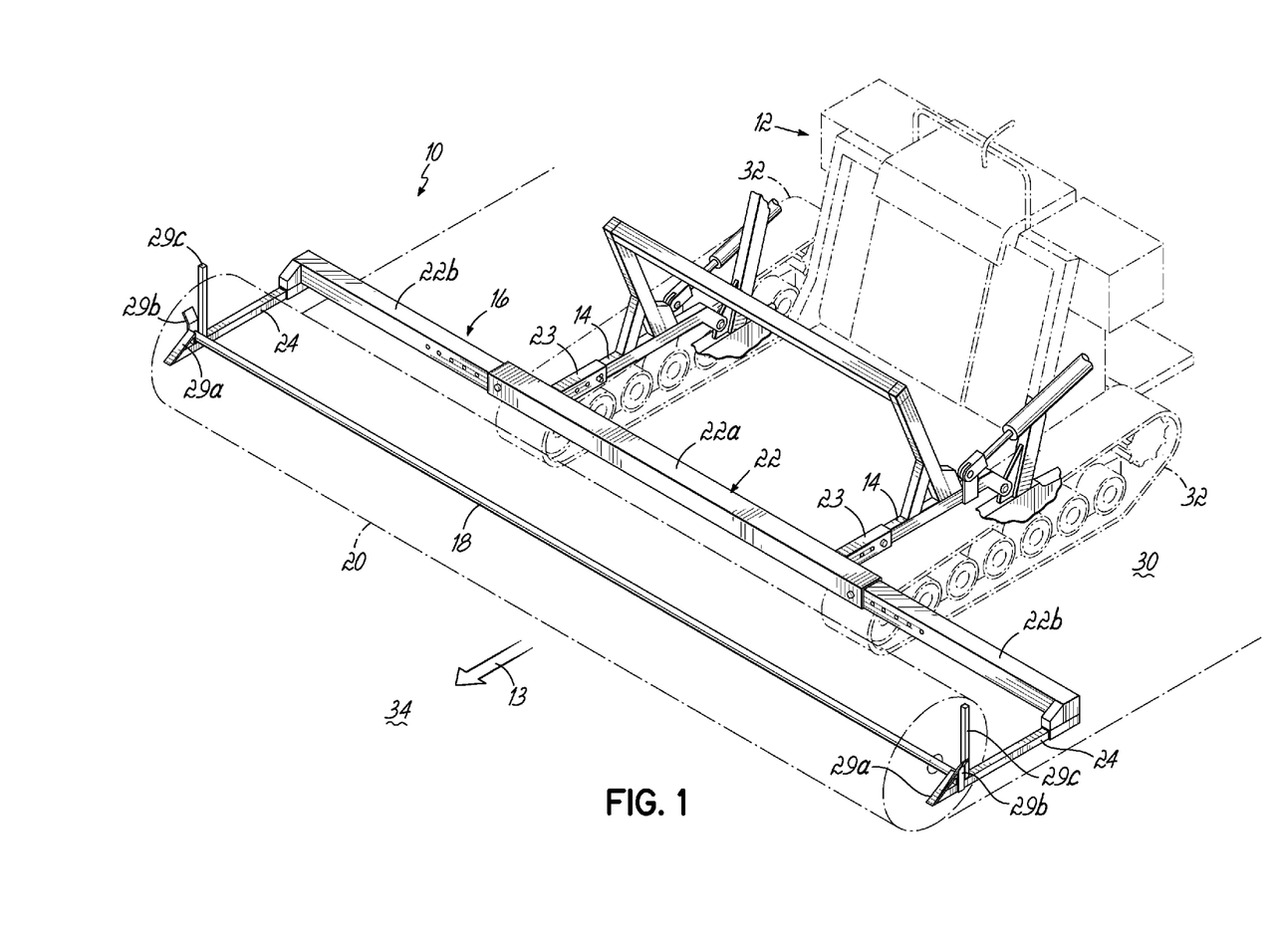
FIG. 1 is a front perspective view of a device for installing synthetic turf according to a first preferred embodiment of the invention, including a turf rollout vehicle and a frame.
Figure 2:
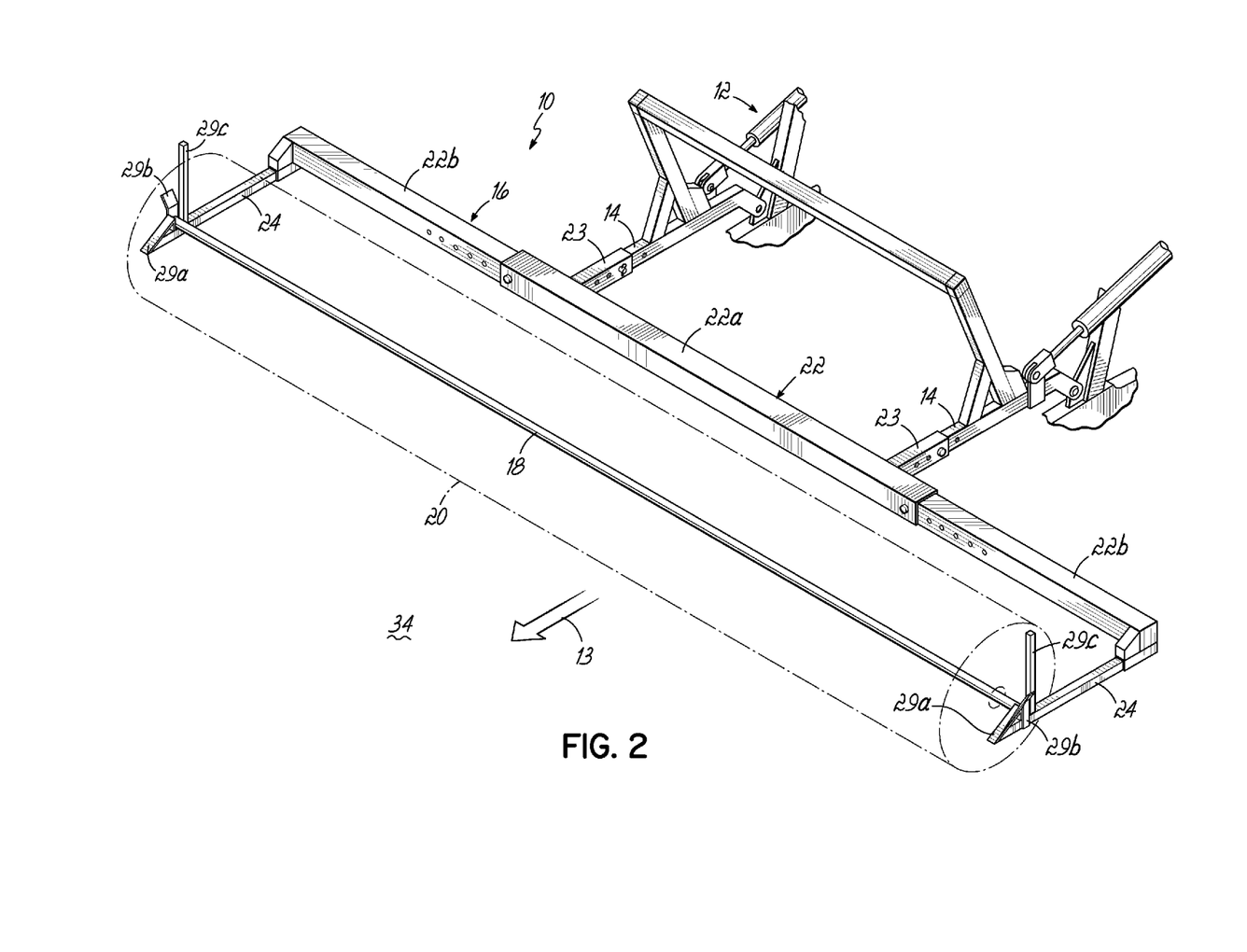
FIG. 2 is an enlarged front perspective view of the frame shown in FIG. 1.

FIG. 1 shows a device 10 for installing synthetic turf on an athletic field. The device 10 comprises a turf rollout vehicle 12 of the type shown in U.S. Pat. No. 5,307,880, entitled "Sod Roll-Out Machine With Endless Tracking" ("the '880 patent"), which is expressly incorporated by reference herein, in its entirety. The vehicle 12 has a pair of spaced arms 14 to which a frame 16 is removably connected. The frame 16 carries a spindle 18 that holds a roll 20 of synthetic turf, with the spindle 18 extending through the roll 20 of synthetic turf. The frame 16 and the roll 20 are also shown in FIG. 2.

The frame 16 includes a transversely oriented crossbar 22 and a pair of spaced carriers 24, located at opposite ends thereof. Each of the carriers includes a group of guide members 29a, 29b, and 29c. These guide members 29c, 29b, and 29c define an upwardly opening channel 29 which is sized and shaped to receive the spindle 18.

The crossbar 22 operatively connects to the arms 14 of the vehicle 12 by a pair of spaced connecting members 23, preferably by bolts. The crossbar 22 includes a central support member 22a that telescopically receives a pair of outer support members 22b to enable the length of the crossbar 22 to be adjusted to accommodate rolls 20 of different length. The outer members 22b preferably connect to the central member 22a by a bolt, or pin, or other mechanical fastener. The outer members 22b have a series of holes, each sized to receive the bolt, to allow adjustment.

As shown in FIG. 1, the vehicle 12 moves in a first forward direction, as shown by directional arrow 13, on top of a section 30 of the turf that has already been unrolled, so that the vehicle 12 itself does not come into direct contact with the underlying prepared base 34. The vehicle 12 includes a pair of spaced endless loop treads 32, and the arms 14 reside within the treads 32. As the vehicle 12 moves in the first direction 13, the treads 32 engage the already unrolled section 30 of synthetic turf, to put tension on the turf still in a roll 20 on the spindle 18.

The crossbar 22 is of a sufficient length, oriented laterally with respect to the vehicle first direction, to carry the roll 20 of synthetic turf. The carriers 24 are oriented perpendicular to the crossbar 22, in the first forward direction. The guide members 29a, 29b, and 29c mount to the carriers 24 and furthermore define the channel 29 in which the spindle 18 rests. All of the components of the frame 16 may be made of welded bar stock.

Figure 3:
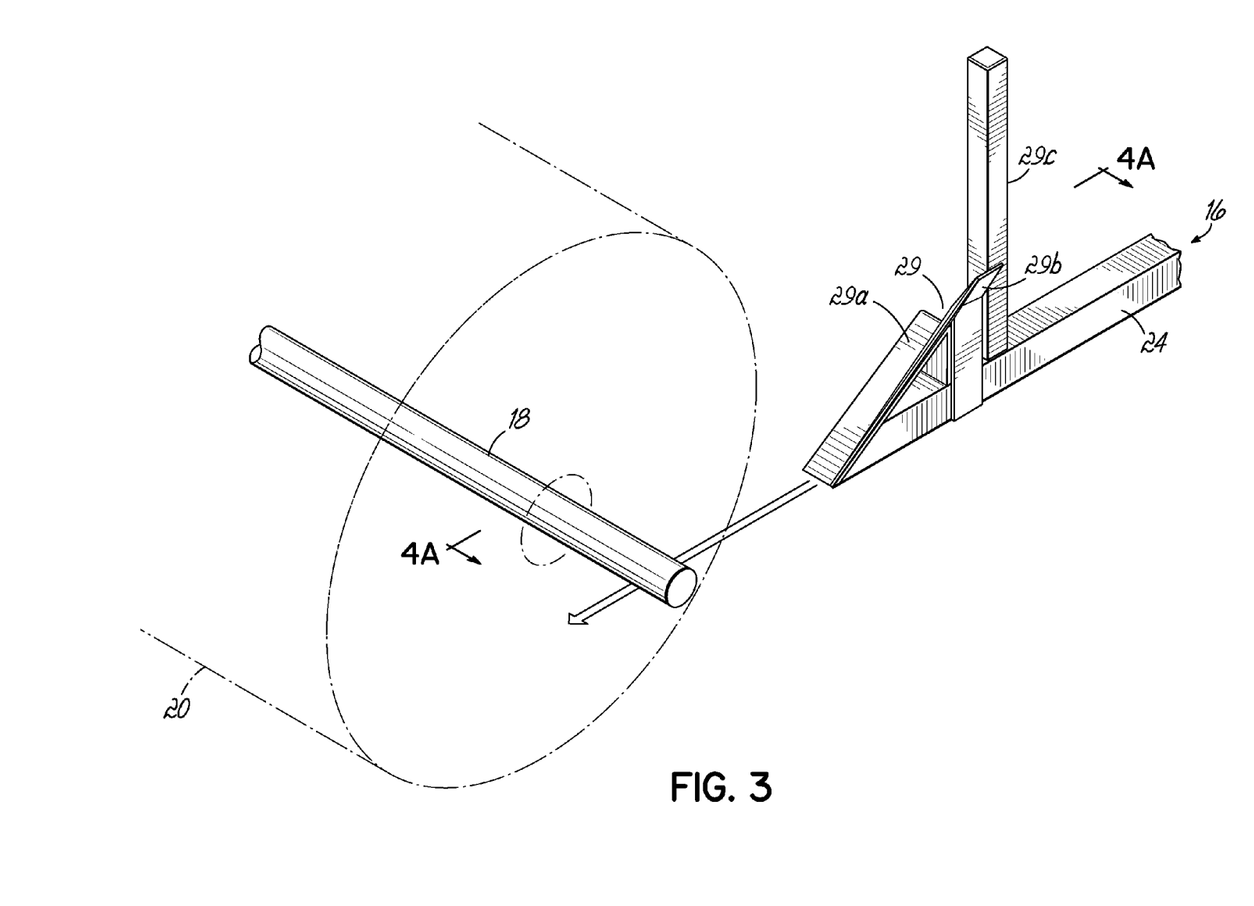
FIG. 3 is an enlarged front perspective view of one end of the frame shown in FIG. 1, and more particularly, a carrier located at the end of the frame for retaining a spindle that holds a roll of turf.
Figure 4A:
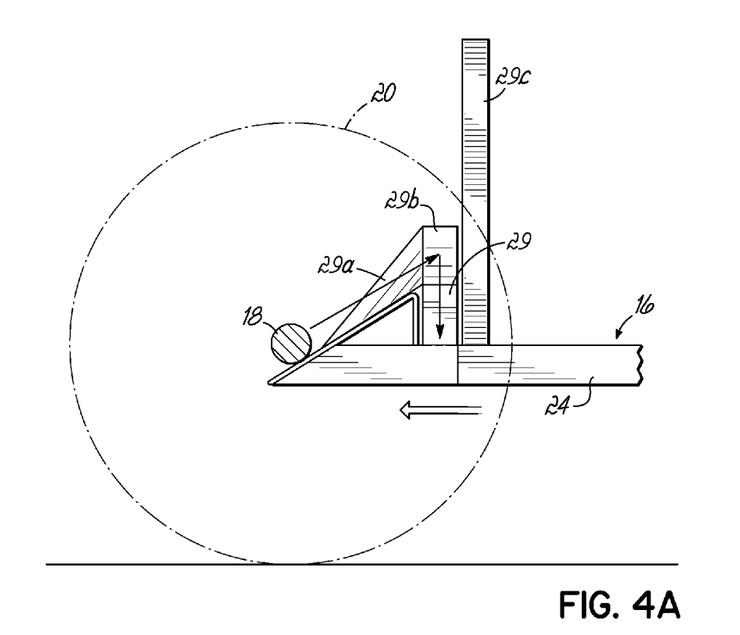
FIG. 4A is a cross-sectional front view of the carrier taken on lines 4A-4A of FIG. 3.
Figure 4B:
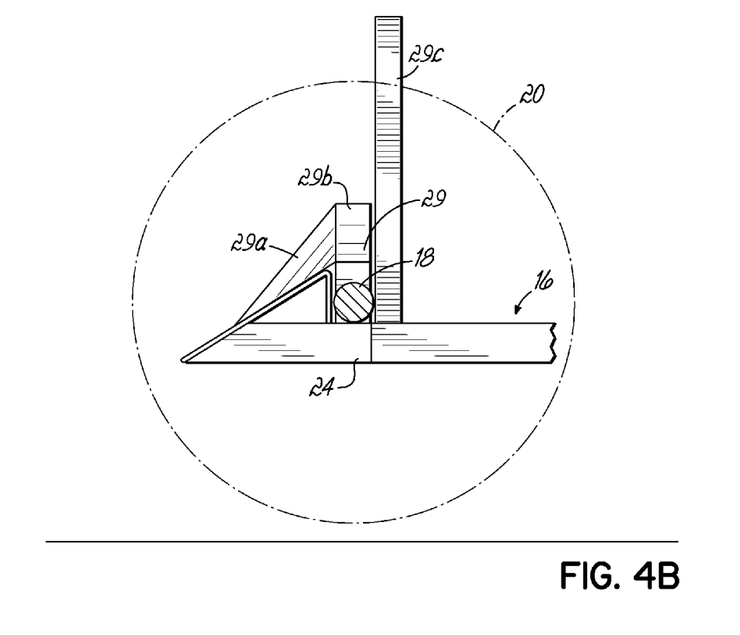
FIG. 4B is a cross-sectional front view of the carrier similar to FIG. 4A, illustrating the guide members of the carrier directing the spindle into a static position within the vertical slot, or channel, of the carrier.

FIGS. 3, 4A, and 4B show one end of the spindle 18 and the roll 20 of synthetic turf when mounted on the frame 16 at one end of the carriers 24. First guide member 29a is angled, to form a ramp. This enables an operator of the vehicle 12 to move the frame 16 so as to position the ends of the spindle 18 in contact with the first guide member 29a, as the roll 20 and spindle 18 rest on the ground. As the operator 36 moves the vehicle 12 and/or lifts the arms 14, the spindle 18 moves up along the first guide member 29a. Eventually, the spindle 18 reaches the end of the first guide member 29a, and then falls by gravity into the channel 29 defined by first guide member 29a, second guide member 29b, and third guide member 29c. The third guide member 29c prevents overtravel of the spindle 18, and does so by serving as a sort of backboard to prevent any further movement of the spindle 18 in the rearward direction. The second guide member 29b laterally restricts the end of the spindle 18.

FIGS. 4A and 4B show the relative positions of the spindle 18 and the guide members 29a, 29b, and 29c.

Figure 5A:
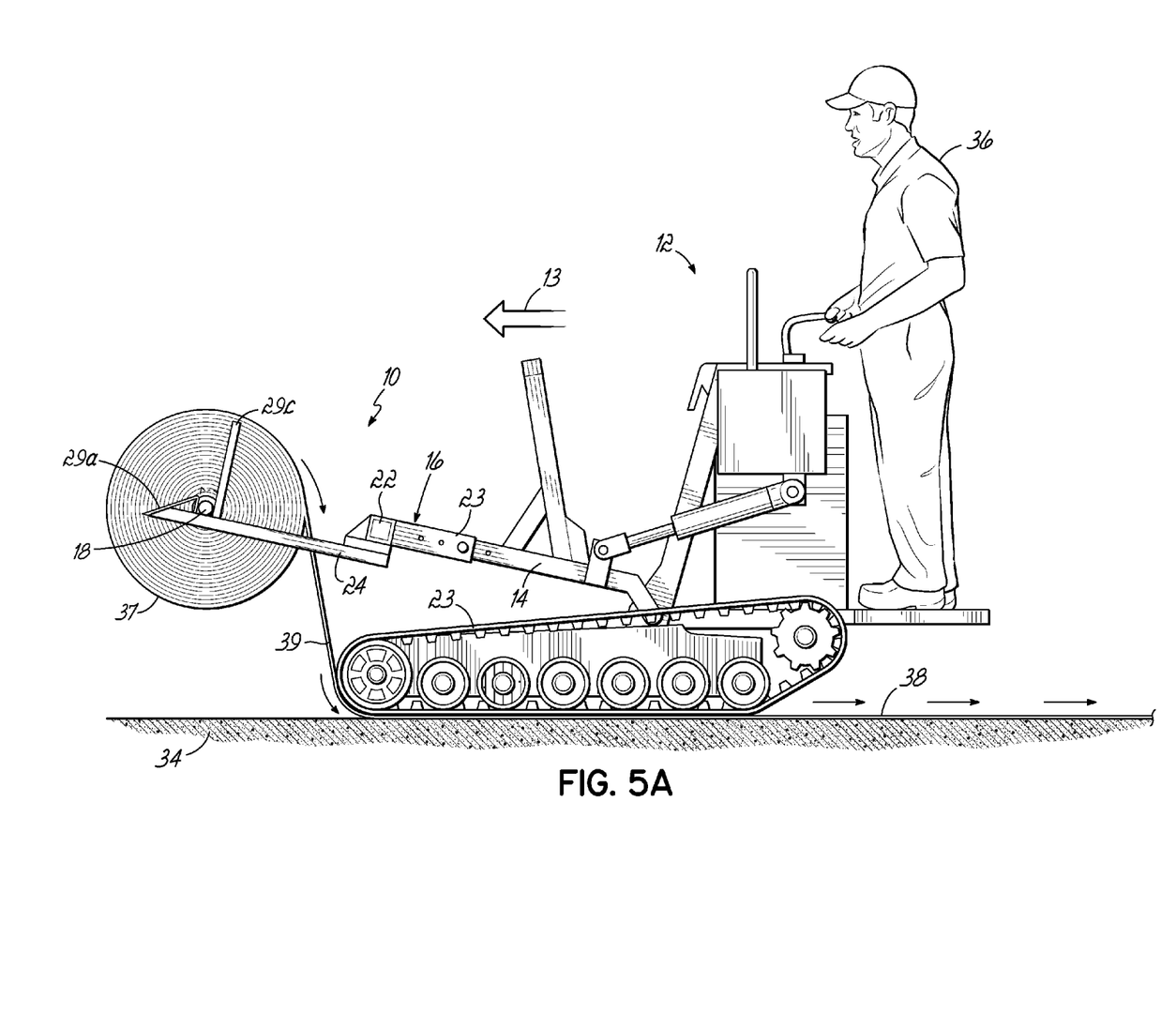
FIG. 5A is a side view of the device of FIG. 1, during the unrolling of an underlying pad.
Figure 5B:
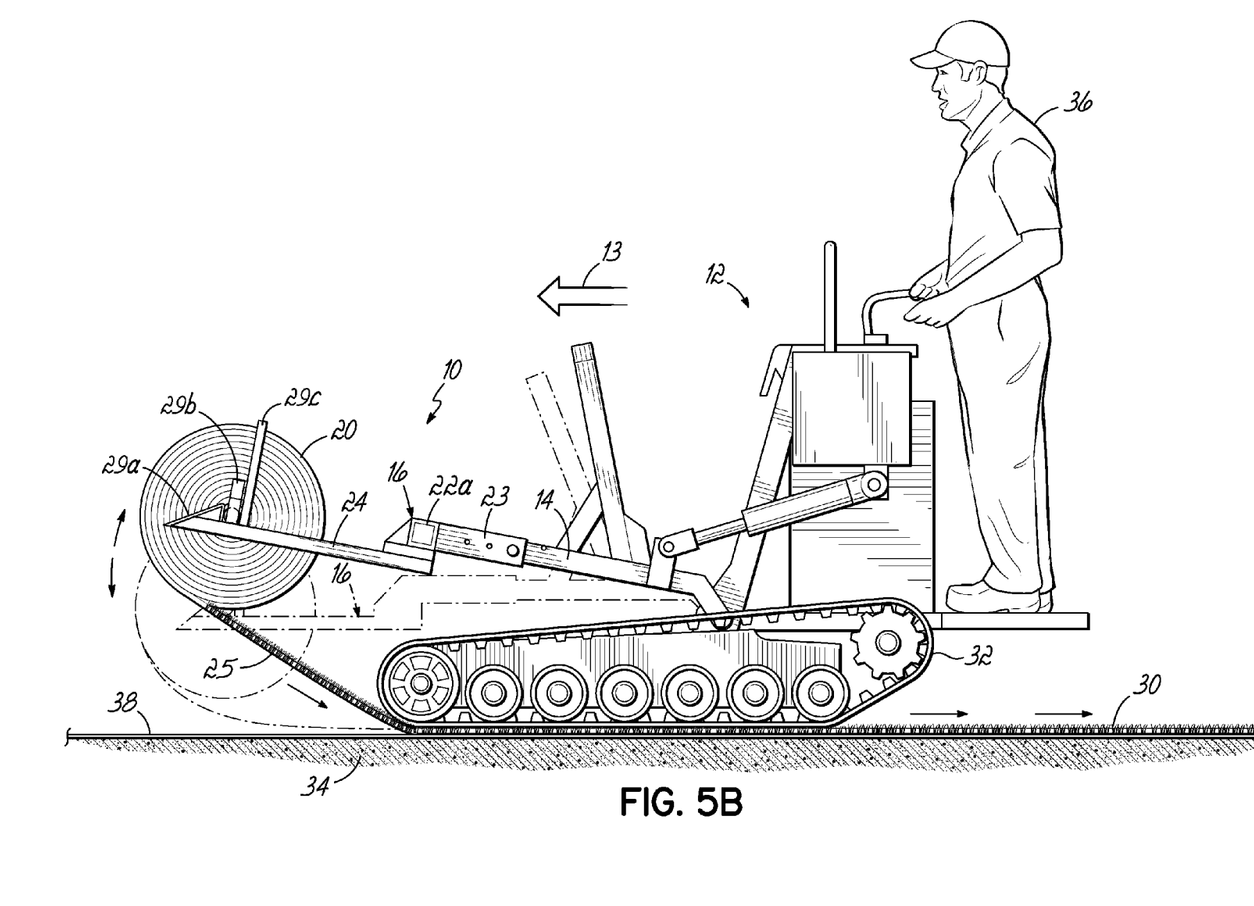
FIG. 5B is side view of the device shown in FIG. 1, during the unrolling of a roll of synthetic turf.

FIGS. 5A and 5B show the use of the method and device 10 of this invention. More particularly, FIG. 5A shows an operator 36 using the device 10 to locate a conventional pad on the prepared surface. The roll 37 of pad is placed on the surface on base 34 as the vehicle 12 moves in the first direction 13. The roll 37 is held by the frame 16, and the vehicle 12 moves on top of an already unrolled section 38 of the pad. This arrangement places in tension that portion 39 of the pad that extends between the roll 37 and the treads 32. With pad, the roll 37 is arranged so as to rotate clockwise (as viewed in FIG. 5A) on the spindle 18 during movement of the vehicle 12, so that the outer surface of the roll 37 eventually becomes the top surface of the already unrolled section 38.

FIG. 5B shows the operator 36 using the device 10 to place synthetic turf on top of the pad 38. More particularly, FIG. 5B shows already unrolled section 30 of synthetic turf located on top of the section 38 of pad and over the base 34. As the vehicle 12 moves in the first direction, the treads 32 move on top of the already unrolled section 30 and place tension on a portion 25 of the turf that extends between the roll 20 and the treads 32. This causes the roll 20 to unroll in a counterclockwise direction (as viewed in FIG. 5B) relative to the spindle 18, so that the surface on the inside of the roll eventually becomes the upwardly directed surface of the athletic field. This is because rolls 20 of synthetic turf have the upwardly extending fibers on the inside, so as to not be exposed.

In FIGS. 5A and 5B, the vehicle 12 rides on top of the pad and the turf, respectively, that has already been unrolled. As the vehicle 12 travels in the first forward direction 13, the endless loop treads 32 engage either the pad 38 or synthetic turf to place tension thereon, and to cause unrolling. During installation, the operator 36 can control the speed of the vehicle 12 and the vertical positioning of the arms 14. The arms 14 raise and lower about an axis, and can thereby accommodate the decrease in the diameter of the roll 20 during installation.

Figure 6:
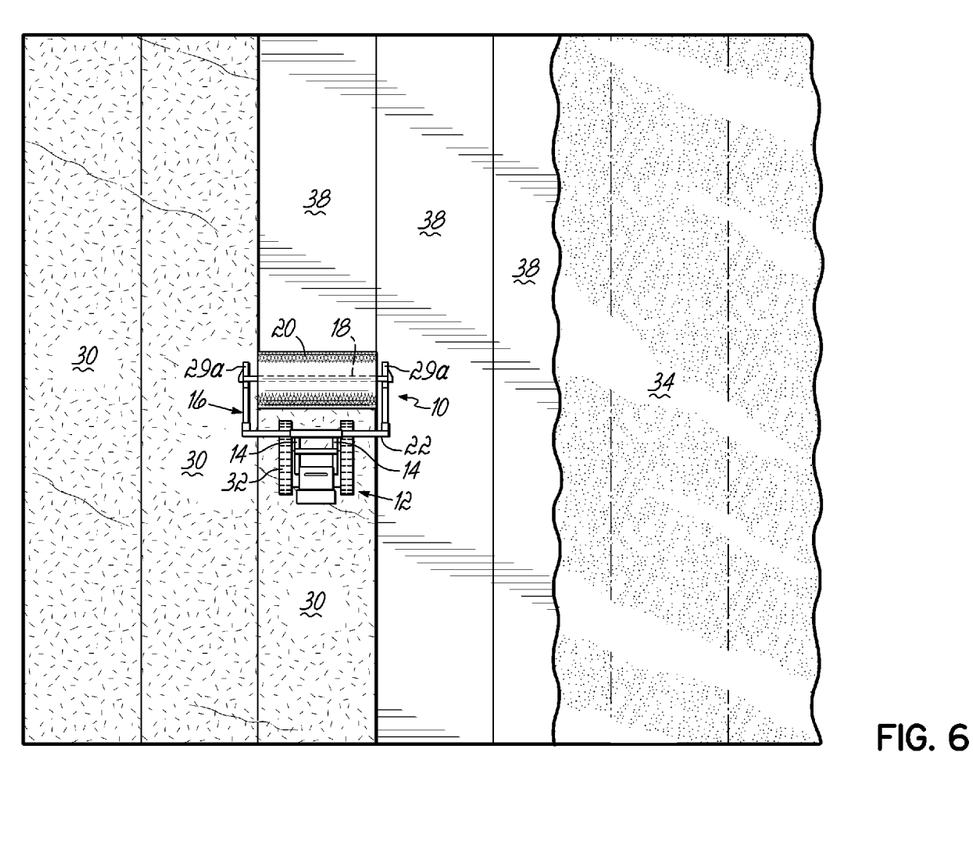
FIG. 6 is a schematic plan view of an athletic field during the installation of a synthetic turf, using the device of FIG. 1.

FIG. 6 shows a plan view of an athletic field, during the installation of a synthetic turf 30, using the method and device 10 of this invention. More particularly, FIG. 6 shows the prepared base 34, rows of pads 38, and the row-like sections 34 of already unrolled synthetic turf. FIG. 6 shows that the frame 16 extends transversely beyond the width of the vehicle 12.

This specification shows and describes a preferred embodiment of the invention. However, those skilled in the art will appreciate that the disclosed embodiment is susceptible to a reasonable amount of modification and/or permutation without departing from the overall scope of the invention. Accordingly, the inventors do not intend to limit the scope of the appended claims to the specific details shown or described.

We claim:

1. A method of installing a synthetic turf athletic field comprising;

moving a vehicle in a first direction and thereby causing a section of synthetic turf to unroll from a rolled condition on a frame carried by the vehicle to an unrolled condition over a base, the frame carried at a first end of the vehicle so as to be at a forward end of the vehicle during moving in the first direction; and     engaging the synthetic turf on the base during the moving of the vehicle in the first direction, so as to maintain tension on the synthetic turf that still remains in the rolled condition, whereby the moving and the engaging eventually causes the entire section of synthetic turf to be located over the base in an unrolled condition and does so without requiring any direct contact between the vehicle and the base.

2. The method of claim 1 further comprising:
removably mounting the frame to the vehicle prior to the moving and engaging.

3. The method of claim 1 further comprising:
placing the section of synthetic turf on the frame in the rolled condition.

4. The method of claim 1 wherein the synthetic turf in the rolled condition has a spindle extending therethrough, and the placing farther comprises:
moving the vehicle relative to the section of synthetic turf in the rolled condition, thereby to hold the spindle, 5. The method of claim 1 wherein the vehicle is motorized.

6. The method of claim 1 wherein the vehicle is supported by a pair of spaced, endless loop treads.

7. The method of claim 1 wherein the vehicle has a lateral dimension, transverse to the first direction, which is less than a lateral dimension of the frame.

8. The method of claim 1 wherein the vehicle includes a pair of arms to which the frame is removably mounted, the arms being raisable and lowerable relative to the vehicle so as to enable the section of synthetic turf in the rolled condition to be held at a desired vertical height, and farther comprising:
placing on the frame the section of synthetic turf in the rolled condition, and raising the arms to a desired vertical level; and
moving to the athletic field the vehicle and the section of synthetic turf in the rolled condition, so as to enable the section of synthetic turf in the rolled condition to thereafter be unrolled over the base.

9. The method of claim I wherein the section of synthetic turf in the rolled condition has a proximal end and a distal end relative to the first end of the frame, and unrolls from the distal end.

10. The method of claim 1 wherein the frame and the section of synthetic turf in the unrolled condition have a transverse dimension that exceeds a transverse dimension of the vehicle.

11. The method of claim 1 further comprising:
unrolling a pad on the base prior to locating the section of synthetic turf over the base, a transverse dimension of the pad being substantially the same as a transverse dimension of the section, whereby the unrolled section of synthetic turf resides on top of the unrolled pad.

12. In combination, the invention comprising:
a motorized turf rollout vehicle having a pair of spaced, endless loop treads, and a pair of spaced arms at a first forward end thereof, the arms located within the treads and being raisable and lowerable about an axis;
a frame removably mounted to the arms of the vehicle; and
a section of synthetic turf carried on the frame in a substantially rolled condition, whereby a leading edge portion of the section of synthetic turf is already unrolled and resides below the treads of the vehicle and above a base, and an intermediate portion of the section of turf extends, in tension, between the leading edge portion and the frame, whereby the remainder of the section of synthetic turf in a substantially rolled condition can be located over the base by moving the turf rollout vehicle in the first direction, with no direct contact between the turf rollout vehicle and the base.

13. The invention of claim 12 further comprising;
a pad residing on the base below the section of synthetic turf.

14. The invention of claim 12 wherein the frame further comprises:
a crossbar removably mounted to the arms of the vehicle;
a pair of carriers coupled to the crossbar at opposite ends thereof; and
a spindle.

15. The invention of claim 14 wherein the crossbar further comprises;
a pair of spaced connecting members operatively connected to the arms.

16. The invention of claim 14 wherein the crossbar further comprises;
a central support member; and
a. pair of outer support members telescopically mounted to the central support member.

17. The invention of claim 14 wherein the crossbar further comprises;
means for adjusting the length of the crossbar, so as to accommodate rolls of synthetic turf of different lengths.

18. The invention of claim 14 wherein each of the carriers further comprises;
a plurality of guide members that define an upwardly opening channel sized to receive the spindle, the guide members arranged so as to direct the spindle into the channel by gravity.

* * * * *